(12) United States Patent
Emmot et al.

(10) Patent No.: US 7,506,130 B2
(45) Date of Patent: Mar. 17, 2009

(54) MIRRORED COMPUTER MEMORY ON SPLIT BUS

(75) Inventors: Darel N. Emmot, Fort Collins, CO (US); Eric M. Rentschler, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1287 days.

(21) Appl. No.: 10/154,649

(22) Filed: May 22, 2002

(65) Prior Publication Data

US 2003/0221059 A1   Nov. 27, 2003

(51) Int. Cl.
*G06F 12/16* (2006.01)
(52) U.S. Cl. .............................. 711/173; 711/5; 711/114
(58) Field of Classification Search ...................... 711/9, 711/114

See application file for complete search history.

(56) References Cited

U.S. PATENT DOCUMENTS

| | | | |
|---|---|---|---|
| 4,093,985 A | 6/1978 | Das | 364/200 |
| 4,150,428 A | 4/1979 | Inrig et al. | 364/200 |
| 5,212,784 A * | 5/1993 | Sparks | 714/6 |
| 5,235,687 A | 8/1993 | Bacot et al. | 395/425 |
| 5,680,539 A * | 10/1997 | Jones | 714/6 |
| 5,742,613 A | 4/1998 | MacDonald | 371/10.3 |
| 5,787,464 A | 7/1998 | Yoshizawa et al. | 711/115 |
| 6,223,301 B1 * | 4/2001 | Santeler et al. | 714/6 |
| 6,295,591 B1 | 9/2001 | Bealkowski et al. | 711/165 |
| 6,418,068 B1 * | 7/2002 | Raynham | 365/200 |
| 6,757,800 B1 * | 6/2004 | Estakhri et al. | 711/168 |
| 6,785,835 B2 * | 8/2004 | MacLaren et al. | 714/6 |
| 2002/0097613 A1 * | 7/2002 | Raynham | 365/200 |

OTHER PUBLICATIONS

Pending U.S. Appl. No. 10/154,648, filed May 22, 2002. Title: "Mirrored Computer Memory On Single Bus." Inventors: Eric M. Rentschler and Michael Kennard Tayler. HP PDNO 100203739-1.

* cited by examiner

*Primary Examiner*—Kevin Verbrugge

(57) ABSTRACT

A fully mirrored memory system includes at least one split memory bus, with each portion of the split memory bus having active memory and mirror memory. Each portion of the memory bus transfers a portion of the data for a memory transaction. If a memory unit is determined to be defective, one portion of the memory bus may be inactivated for hot swapping of memory, and the system can continue to operate using an active portion of the memory bus.

3 Claims, 3 Drawing Sheets

MIRRORED COMPUTER MEMORY ON SPLIT BUS

FIELD OF INVENTION

This invention relates generally to computer memory systems.

BACKGROUND OF THE INVENTION

For mission-critical computer systems, one key operational parameter is availability. If parts of a system fail, the system should continue to be available, preferably with no reduction in performance.

It is known to provide spare memory modules, with a way to automatically substitute a working module for a defective module. See, for example, U.S. Pat. No. 4,093,985. Typically, because of the cost of memory, the amount of memory used as spare memory is much less than the amount of memory actively being used. As a result, when errors are detected in a defective memory unit, the contents of the defective unit must be copied to the spare memory before the defective unit is inactivated. Depending on the size of the defective unit, copying the contents may affect performance.

Where both availability and full performance are critical, it is known to provide two completely separate redundant memory systems with identical data contents. If errors in one of the systems exceed a predetermined threshold, the system with errors may be inactivated and the other memory system may be activated, with little or no impact on performance. Such systems are called mirrored memory systems. If memory modules can be replaced while the overall computer system is running, replacement is sometimes called hot swapping, or hot plugging.

FIG. 1 illustrates a mirrored memory system with two separate controllers and two separate memory busses. A processor 100 communicates over a processor bus to two memory controllers 102 and 104. Controller 102 controls a first memory bus A. Controller 104 controls a second memory bus B. Two memory units, A0 and A1 are illustrated on memory bus A. Two memory units, B0 and B1 are illustrated on memory bus B. In the configuration illustrated in FIG. 1, controllers 102 and 104 operate in parallel. Whatever is written to memory unit A0 is also written to memory unit B0. Whatever is written to memory unit A1 is also written to memory unit B1. Memory read transactions only use one memory bus. For example, if memory bus A is active, then memory bus B is not used for memory read transactions. If, for example, memory bus A is active, and memory unit A1 is determined to be defective (for example, correctable memory errors), memory read transactions may be switched from memory bus A to memory bus B. Power to memory bus A may be disconnected, and an entire bank of memory containing memory unit A1 may be removed and replaced, with no interruption of service or impact on performance. After memory unit A1 is replaced, data in memory unit B1 is copied to replacement unit A1 for full mirroring. This copying of data may be performed as a background process without affecting performance.

Mirrored memory systems typically duplicate complex and expensive memory controllers and memory busses. There is a need for less expensive and less complex mirrored memory systems.

SUMMARY OF THE INVENTION

A fully mirrored memory system includes at least one split memory bus, with each portion of the split memory bus having active memory and mirror memory. Each portion of the memory bus transfers a portion of the data for a memory transaction. If a memory unit is determined to be defective, one portion of the memory bus may be inactivated for hot swapping of memory, and the system can continue to operate using an active portion of the memory bus.

DETAILED DESCRIPTION OF THE PREFERRED EMBODIMENT OF THE INVENTION

Figure 2:
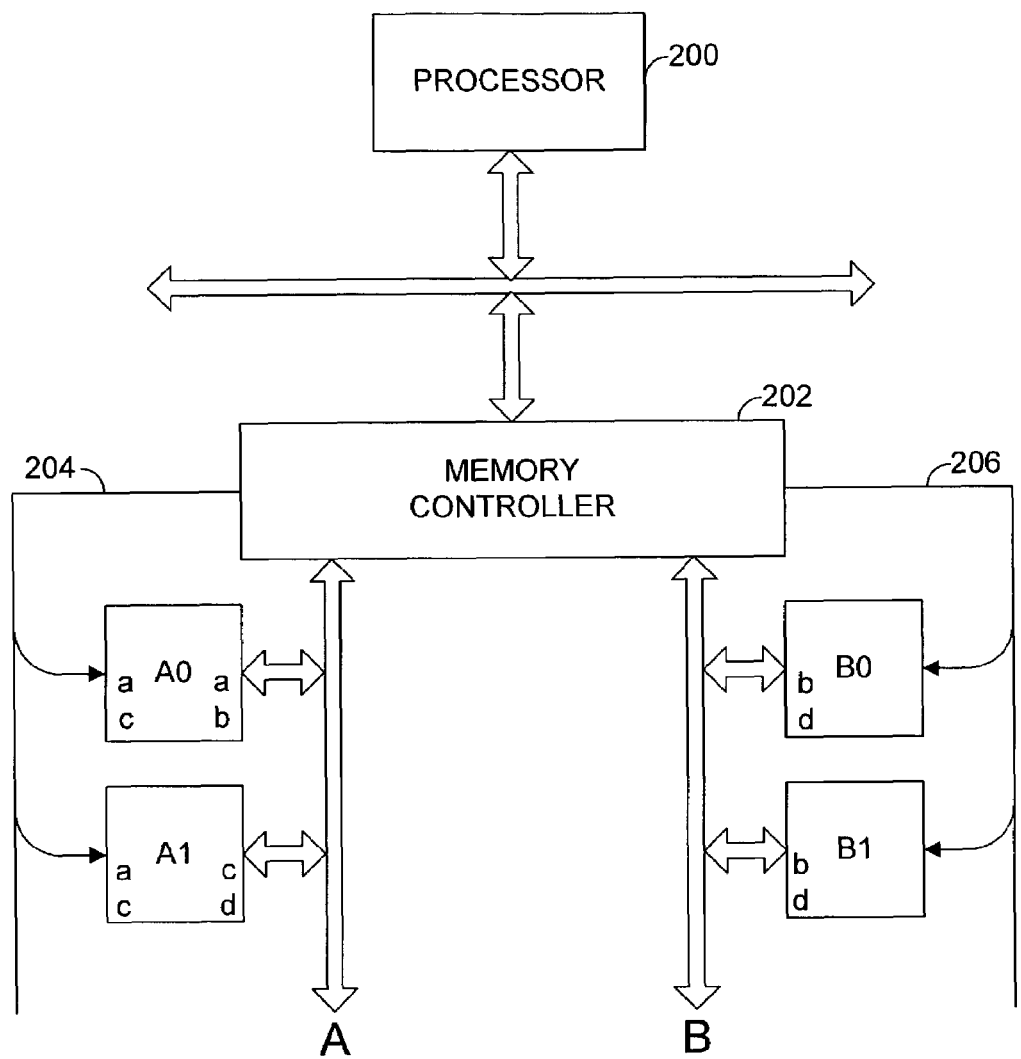
FIG. 2 is a block diagram illustrating an example embodiment of a mirrored memory system in accordance with the invention.

FIG. 2 illustrates an example embodiment of a mirrored memory system in accordance with the invention. In the configuration of FIG. 2, a processor 200 communicates with a memory controller 202, which in turn controls two portions, A and B, of a split memory bus. In response to a memory transaction by the processor, each memory bus portion (A and B) transfers half the data. As will be discussed further below, the example system of FIG. 2 provides full mirroring with only nominal incremental control hardware, provides hot swapping, and provides increased performance.

In the example system of FIG. 2, two of an arbitrary number of memory units (A0, A1) are connected to portion A of the memory bus, and two of an arbitrary number of memory units (B0, B1) are connected to portion B of the memory bus. The term "memory unit" refers to any amount of memory that can be logically controlled (enabled or disabled) by the select-signal lines. A memory unit may or may not correspond to a physical module or assembly.

Typically, a memory is organized into words (for example, 32 bits or 64 bits per word). The minimum amount of data that can be transferred to and from main memory, in response to a memory transaction, is commonly called a line, or sometimes a block. A line is typically multiple words (for example, eight words per line). The following discussion uses the term "line" for a minimum amount of data transfer, but the invention is equally applicable to blocks, or other memory data organizations. The width of a memory bus is typically less than a line. Typically, a burst of memory bus transactions is needed to transfer one line of data in response to a memory transaction.

In FIG. 2, lower case letters are used to identify halves of lines of data. One data line is represented by "a" and "b", and another data line is represented by "c" and "d". For example, "a" may represent the four most significant words of a line and "b" may represent the four least significant words of a line. The lower case letters in the lower left corner of each memory unit illustrate the memory unit locations of the data line halves before hot swapping. The lower case letters in the lower right corner of memory units A0 and A1 illustrate the memory unit locations of the various data line halves during hot swapping, which is explained in more detail below.

Memory on memory bus portion A is fully mirrored on memory bus portion A, and memory on memory bus portion B is fully mirrored on memory bus portion B. For example, memory unit A1 may mirror memory unit A0, and memory unit B1 may mirror memory unit B0. This is depicted by the lower case letters in the lower left corner of each memory unit.

Data is written to at least two different memory units on each portion of the memory bus. Data is read from only one memory unit on each portion of the memory bus. For example, memory write transactions to memory unit A0 are also written to memory unit A1, and memory write transactions to memory unit B0 are also written to memory unit B1. For memory read transactions, only one of a mirrored pair of memory units is used. That is, if memory units A0 and A1 are a mirrored pair, then only one of units A0 and A1 is used for a memory read transaction. Select-signal lines 204 and 206 are used to control which memory units are used for reading and writing.

In typical commercially available memory circuits, memory units are connected in parallel to all data signals and most control signals on a memory bus, and there is a separate signal for each memory unit that controls whether the memory unit responds to the memory bus signals. In many commercially available circuits, the separate control signal is called Chip-Select. However, the term "select-signal" is intended to include any signal, including Chip-Select, that can control whether a memory unit responds to a memory bus transaction.

Figure 1:
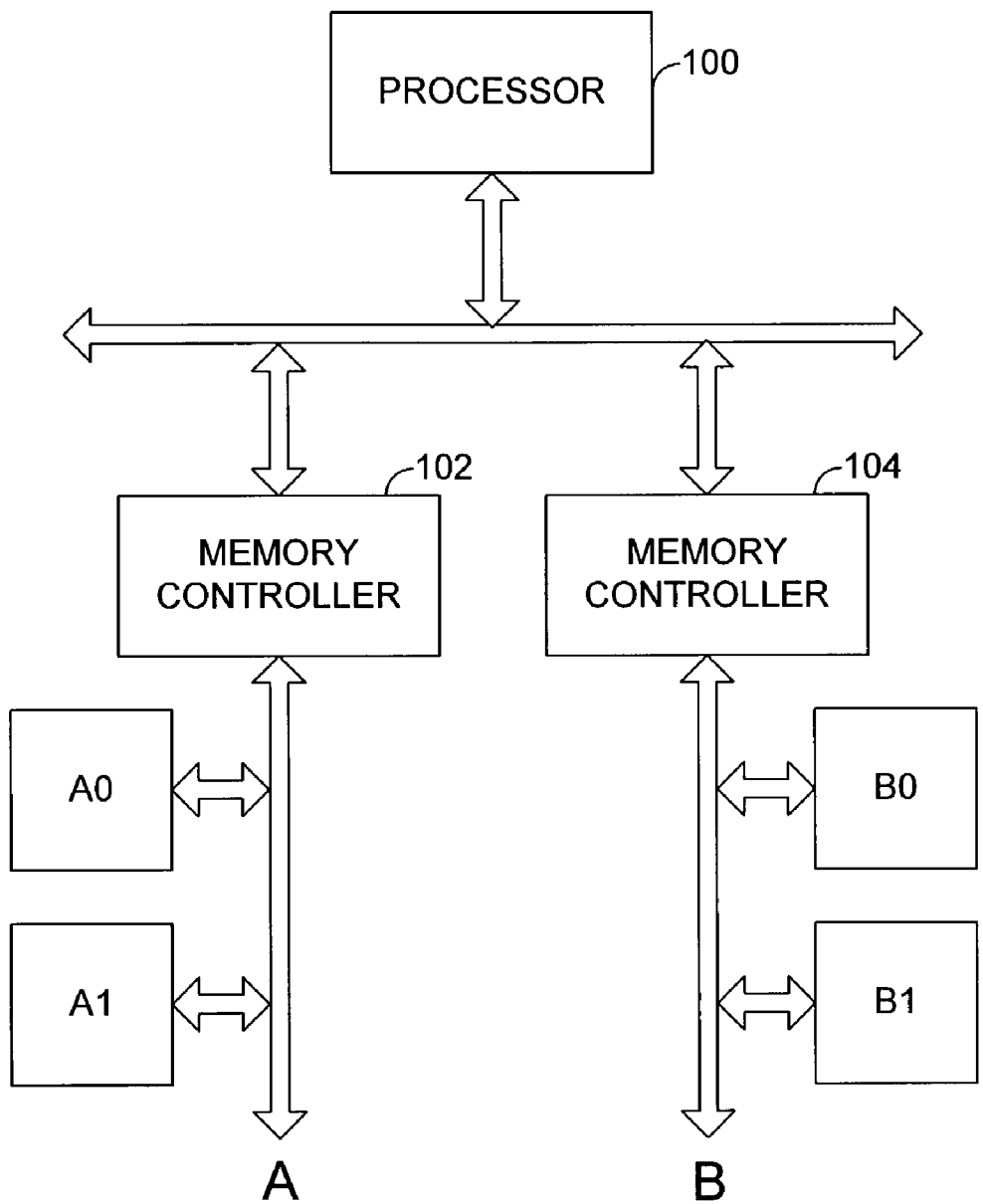
FIG. 1 is a block diagram illustrating a prior art mirrored memory system.

Comparing the system of FIG. 2 to the system of FIG. 1, the system of FIG. 2 provides full mirroring with only a nominal amount of incremental control circuitry. The only incremental control circuitry is a change to the signal-select control lines. Signal-select control lines, such as Chip Select, are required even without mirroring. In the system of FIG. 2, the signal-select control lines are used to select two memory units on each memory bus portion for each memory write transaction instead of one memory unit, and are used to select one memory unit on each memory bus portion for reading. This selection of memory units on one memory bus portion requires very little incremental logic circuitry over a system without mirroring. The resulting system provides full mirroring with one memory controller and less incremental control circuitry than a system with two controllers that mirrors across separate memory busses.

In the example system of FIG. 2, if one memory unit is determined to be defective, memory read transactions may be switched to a corresponding mirror unit on the same portion of the memory bus. For example, if memory unit A0 is defective, memory read transactions for A0 may be switched to memory unit A1 by using the select-signal control lines 204.

The example system of FIG. 2 also provides hot-swapping. If one memory unit is determined to be defective (for example, error rate exceeds a predetermined threshold), then one memory bus portion can be inactivated (logically disabled or physically shut down) to enable hot swapping. If one memory bus portion is inactivated, then the system can continue to run using the one remaining memory bus portion (at a lower performance). First, mirroring is disabled, and data from memory units on the memory bus portion that is be inactivated are transferred to memory units on the memory bus portion that is to remain active.

When data is read in bursts, all reads within one burst on one portion of the memory bus are preferably read from one memory unit. If, for example, some memory bus transactions in a burst of transactions are from one memory unit, and some are from another memory unit, there will be some delay involved in addressing and accessing a second memory unit. Accordingly, when one portion of a memory bus is disabled for hot swapping, it is preferable to organize the data in the active portion of the memory bus so that all the data for each line is in the same memory unit.

Assume, for example, that memory unit B0 in FIG. 2 is determined to be defective. First, mirroring is disabled. Next, it is preferable to copy data from memory unit B1, the mirror memory unit for memory unit B0, since data from defective memory unit B0 may not be valid. Then, it is preferable to copy line half "b" from memory unit B1 to the same memory unit as line half "a", so that both "a" and "b" can be read in one burst from one memory unit. This is depicted by the lower case letters "a" and "b" in the lower right corner of memory unit A0. Similarly, it is preferable to copy line half "d" from memory unit B1 to the same memory unit as line half "c", so that both "c" and "d" can be read in one burst from one memory unit. This is depicted by the lower case letters "c" and "d" in the lower right corner of memory unit A1. Then, for any one memory transaction from the processor, all the data is transferred by memory unit A0, or all the data is transferred by memory unit A1. The computer system then continues to operate using the active memory bus portion A.

Comparing the system of FIG. 2 to the system of FIG. 1, if memory bus portion A in FIG. 2 is the same width as memory bus A in FIG. 1, and if memory bus portion B in FIG. 2 is the same width as memory bus B in FIG. 1, then the split memory bus of FIG. 2 provides twice the performance of the two memory busses of FIG. 1, because the split memory bus of FIG. 2 transfers twice as much active data in parallel. In the system of FIG. 1, for each memory write transaction, half of the data signal lines are used only for carrying redundant mirror data, and for each memory read transaction, half of the data signal lines are not used. In contrast, in the system of FIG. 2, for each memory write transaction, each data signal line carries active data and mirror data simultaneously, and for each memory read transaction, every data signal line is used.

Assume eight words per line. Assume that each memory bus in FIG. 1 is two words wide (plus bits for error detection and correction), and assume that each portion of the memory bus in FIG. 2 is two words wide (plus bits for error detection and correction). In response to a memory transaction from the processor, one memory bus in the system in FIG. 1 would require a burst of four memory bus transactions (two words in parallel for each memory bus transaction) to transfer one line (eight words) of data. In contrast, each portion of the memory bus in FIG. 2 would require a burst of two memory bus transactions (two words in parallel for each of two bus portions) to transfer one line (eight words) of data. Accordingly, the split memory bus in FIG. 2 can transfer a line of data in approximately half the time required by the two independent memory busses in the system of FIG. 1.

Alternatively, if memory bus portion A in FIG. 2 is half the width of memory bus A in FIG. 1, and if memory bus portion B in FIG. 2 is half the width of memory bus B in FIG. 1, then the split memory bus of FIG. 2 provides the same performance as the two independent memory busses of FIG. 1, but with approximately half the memory bus hardware and memory bus space as the memory busses of FIG. 1.

Figure 3:
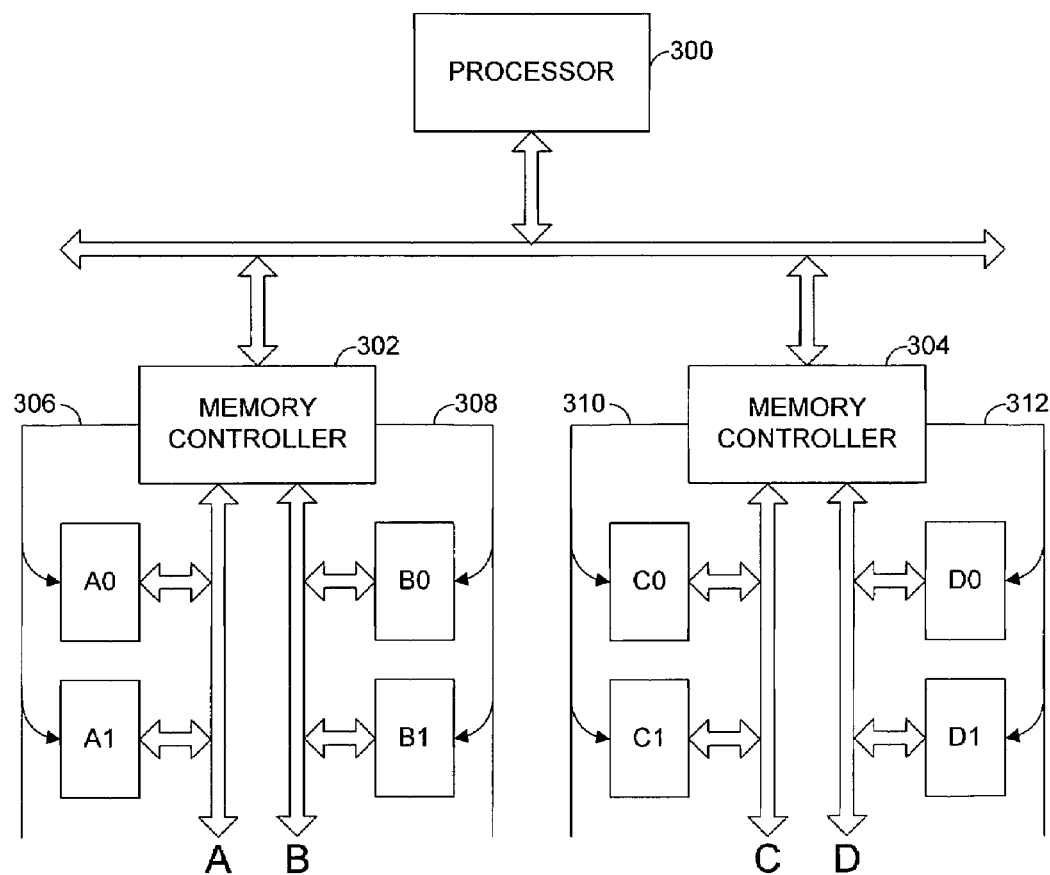
FIG. 3 is a block diagram illustrating an additional example embodiment of a mirrored memory system in accordance with the invention.

Alternatively, a split memory bus could be divided into more than two portions. For example, a split memory bus could be divided into four portions. Because of capacitive loading, there is a limit to the number of parallel memory units that can be driven on one bus portion at high clock frequencies. Accordingly, as memory requirements increase, there may be a need to partition the memory space over multiple busses. FIG. 3 illustrates a system in which memory is partitioned onto two independent split memory busses, with full mirroring on each portion of each memory bus.

In FIG. 3, a processor 300 communicates over a processor bus to two memory controllers (302, 304). Each memory controller controls a split bus. Memory controller 302 controls a bus that is split into two portions A and B. For memory controller 302, each memory line is split between memory bus portion A and memory bus portion B. Memory controller 304 controls a bus that is split into two portions C and D. For memory controller 304, each memory line is split between memory bus portion C and memory bus portion D.

In the example system of FIG. 3, for the memory bus connected to memory controller 302, two of an arbitrary number of memory units (A0, A1) are connected to portion A, and two of an arbitrary number of memory units (B0, B1) are connected to portion B. For the memory bus connected to memory controller 304, two of an arbitrary number of memory units (C0, C1) are connected to portion C, and two of an arbitrary number of memory units (D0, D1) are connected to portion D. Each memory unit is mirrored by another memory unit on the same memory bus portion. For example, memory unit A1 may mirror memory unit A0, and so forth. Select-signal lines (306, 308, 310, 312) are used to control which memory units are used for reading and writing.

Assume, as in the examples above, eight words per line. Assume that each memory bus in FIG. 1 is two words wide (plus bits for error detection and correction), and assume that each portion of each memory bus in FIG. 3 is one word wide (plus bits for error detection and correction). In response to a memory transaction from the processor, one memory bus in the system in FIG. 1 would require a burst of four memory bus transactions (two words in parallel for each memory bus transaction) to transfer one line (eight words) of data. In contrast, with four memory bus transactions on each memory bus portion, the two split memory busses in FIG. 3 would transfer two lines (one-eighth of one line per bus portion per memory bus transaction). Accordingly, the system illustrated in FIG. 3 can provide approximately twice the memory data transfer rate of the system of FIG. 1, with approximately the same amount of hardware.

Assume, for example, that memory space for the system illustrated in FIG. 3 is partitioned such that even memory line addresses are mapped to memory controller 302, and odd memory line addresses are mapped to memory controller 304. Two consecutive memory lines (or any other combination of one even line address and one odd line address) could then be read or written in parallel.

For the example system illustrated in FIG. 3, hot swapping may be performed as discussed in conjunction with FIG. 2. That is, data on one portion of one memory bus may be transferred to the other portion of the same memory bus. Alternatively, providing two separate split memory busses enables more flexibility for hot swapping. For example, memory may be remapped and one entire bus controller may be inactivated, just as for the two bus system in FIG. 1.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method comprising:
    storing a first portion of a line in a first memory unit on a first portion of a memory bus;
    storing a second portion of the line in a second memory unit and a third memory unit, the second and third memory units on a second portion of the memory bus;
    determining that the second memory unit is defective;
    transferring the second portion of the line from the third memory unit to the first memory unit; and
    replacing the second memory unit.

2. The method of claim 1, further comprising:
    continuing to use the first portion of the memory bus while the second memory unit is being replaced.

3. The method of claim 1, further comprising:
    storing a first portion of a second line in the first memory unit, and in a fourth memory unit, the first and fourth memory units on the first portion of the memory bus;
    storing a second portion of the second line in the second and third memory units;
    transferring the second portion of the second line from the third memory unit to the fourth memory unit when it is determined that the second memory unit is defective.

* * * * *